(12) United States Patent
Park et al.

(10) Patent No.: US 11,280,878 B2
(45) Date of Patent: Mar. 22, 2022

(54) RADAR SYSTEM AND TRANSMISSION APPARATUS THEREFOR

(71) Applicant: MANDO CORPORATION, Pyeongtaek-si (KR)

(72) Inventors: Jong Gyu Park, Yongin-si (KR); Hyeon Dong Cho, Seongnam-si (KR); HanYeol Yu, Suwon-si (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 298 days.

(21) Appl. No.: 16/381,618

(22) Filed: Apr. 11, 2019

(65) Prior Publication Data

US 2019/0317185 A1 Oct. 17, 2019

(30) Foreign Application Priority Data

Apr. 12, 2018 (KR) .......................... 10-2018-0042476

(51) Int. Cl.
*G01S 7/02* (2006.01)

(52) U.S. Cl.
CPC ............ *G01S 7/023* (2013.01); *G01S 7/0233* (2021.05); *G01S 7/0234* (2021.05)

(58) Field of Classification Search
CPC ....................................................... G01S 7/023
See application file for complete search history.

(56) References Cited

U.S. PATENT DOCUMENTS

| | | | |
|---|---|---|---|
| 6,614,387 B1 | 9/2003 | Deadman | |
| 2013/0147664 A1* | 6/2013 | Lin ...................... | H01Q 13/085 342/372 |
| 2015/0042513 A1* | 2/2015 | Foo ........................ | H01Q 21/24 342/368 |
| 2016/0238694 A1* | 8/2016 | Kishigami .............. | G01S 7/021 |
| 2018/0149735 A1* | 5/2018 | Lim ...................... | H01Q 21/065 |
| 2018/0259632 A1* | 9/2018 | Kishigami .............. | G01S 7/288 |

(Continued)

FOREIGN PATENT DOCUMENTS

| | | |
|---|---|---|
| JP | 2002-101000 A | 4/2002 |
| JP | 2002-525641 A | 8/2002 |

(Continued)

*Primary Examiner* — Marcus E Windrich
(74) *Attorney, Agent, or Firm* — Morgan, Lewis & Bockius LLP

(57) ABSTRACT

The present disclosure relates to a radar system and a transmission apparatus therefor, including a signal generator for generating a first signal; a phase adjuster configured to include a plurality of input ports and at least one output port, to generate a second signal by adjusting the phase of the first signal according to an input port through which the first signal is transmitted among the plurality of input ports, and to output the generated second signal to an antenna unit; and a port selector configured to select at least one of the plurality of input ports of the phase adjuster according to an identification code and to transmit the first signal through the selected input port so that a transmission signal radiated through the antenna unit is phase inverted or formed in a pattern corresponding to the identification code, so that interference by the other radar system can be minimized, and the accuracy, reliability and frequency efficiency of the radar system can be improved.

9 Claims, 13 Drawing Sheets

(56) References Cited

U.S. PATENT DOCUMENTS

2019/0064340 A1*  2/2019  Kim .................. G01S 13/93
2019/0154793 A1*  5/2019  Kim .................. G01S 13/931
2020/0386853 A1* 12/2020  Beise ................ G01S 7/354

FOREIGN PATENT DOCUMENTS

| KR | 10-0374911 B1 | 1/1996 |
| KR | 2007-0008312 A | 1/2007 |
| KR | 10-0964338 B1 | 6/2010 |
| KR | 10-0971765 B1 | 7/2010 |
| KR | 2013-0016884 A | 2/2013 |
| KR | 2016-0132461 A | 11/2016 |
| KR | 2017-0072325 A | 6/2017 |

* cited by examiner

Code Matching Point

RADAR SYSTEM AND TRANSMISSION APPARATUS THEREFOR

CROSS REFERENCE TO RELATED APPLICATION

This application claims priority from Korean Patent Application No. 10-2018-0042476, filed on Apr. 12, 2018, which is hereby incorporated by reference for all purposes as if fully set forth herein.

BACKGROUND OF THE INVENTION

1. Field of the Invention

The present disclosure relates to a radar system and a transmission apparatus for the radar system. More particularly, the present disclosure relates to the radar system and the transmit apparatus capable of generating a transmission signal having a different phase according to the designated code to minimize the interference, thereby of efficiently using the frequency and improving the accuracy and reliability.

2. Description of the Prior Art

A radar system for a vehicle is essential for implementing intelligent transportation systems. The radar system may detect movement of other vehicles or objects that are moving or stopping at a radius of hundreds of meters to prevent accidents caused by poor weather conditions or driver's carelessness. This radar system may be a safe operation system of a vehicle developed for these purposes.

A vehicle equipped with this radar system may provide various safety functions or convenience functions by using the information between the vehicle and surrounding objects including the distance, relative speed and angle.

Recently, as the number of vehicles equipped with radar systems increases, the possibility of interference due to the limitation of the frequency bandwidth that can be used by the vehicle radar system is increasing, and it is required to utilize the limited frequency resource efficiently.

In addition, since the vehicle radar system is directly related to the safety of the vehicle occupant, high reliability and accuracy are required. Therefore, the vehicle radar system should be able to accurately distinguish the received signal from the interference signal.

SUMMARY OF THE INVENTION

For this background, an object of the present disclosure is to provide a transmission apparatus of a radar system capable of adjusting a phase of a transmission signal according to a specified identification code and transmitting phase-adjusted transmission signal.

Another object of the present disclosure is to provide a radar system capable of minimizing interference by easily identifying a received signal corresponding to the phase-adjusted transmission signal based on the identification code.

Another object of the present disclosure is to provide a radar system with high accuracy and reliability by minimizing interference.

Another object of the present disclosure is to provide a radar system capable of easily distinguishing a received signal from an interference signal by using an identification code even in the same frequency band so as to efficiently utilize a limited frequency bandwidth.

In accordance with an aspect of the present disclosure, there is provided a transmission apparatus for the radar system including: a signal generator configured to generate a first signal; a phase adjuster including a plurality of input ports and at least one output port, the phase adjuster being configured to generate a second signal by adjusting a phase of the first signal according to an input port through which the first signal is transmitted among the plurality of input ports, and to output the generated second signal to an antenna unit; and a port selector configured to select at least one of the plurality of input ports of the phase adjuster according to an identification code and to transmit the first signal through the selected input port so that a transmission signal radiated through the antenna unit is phase inverted or formed in a pattern corresponding to the identification code.

In accordance with another aspect of the present disclosure, there is provided a radar system including: an antenna unit in which a plurality of feeding elements are arranged; a transmitter configured to generate a first signal, adjust a phase of the first signal in response to an identification code to generate a second signal, and to output the second signal to the antenna unit; a receiver configured to pre-process a receiving signal received through the antenna unit and to filter the receiving signal based on the identification code to extract a reflection signal reflected from a target; and a signal processor configured to transmit the identification code to the transmitter and the receiver and to analyze the reflection signal to acquire information about the target.

According to the antenna apparatus and the radar apparatus of the present disclosure, it is possible to minimize the signal interference in the radar system, improve the detection accuracy and reliability, and utilize the frequency efficiently.

DETAILED DESCRIPTION OF THE EXEMPLARY EMBODIMENTS

Figure 1:
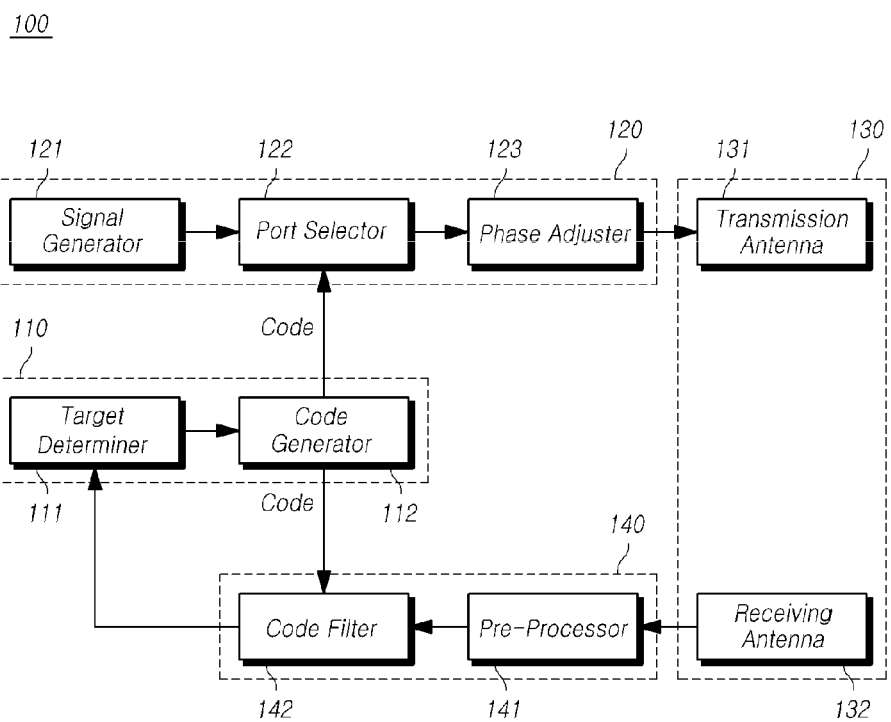
FIG. 1 is a schematic block diagram of the radar system according to an embodiment of the present disclosure.

Hereinafter, embodiments of the present disclosure will be described with reference to exemplary diagrams. In the specification, in adding reference numerals to components throughout the drawings, it should be noted that like reference numerals designate like components even though components are shown in different drawings. Further, in describing embodiments of the present disclosure, well-known functions or constructions will not be described in detail since they may unnecessarily obscure the understanding of the present disclosure.

Further, terms such as 'first', 'second', 'A', 'B', '(a)', and '(b)' may be used for describing components of the present disclosure. These terms are used only for discriminating the components from other components, so the essence or order of the components indicated by those terms is not limited. It should be understood that when one element is referred to as being "connected to", "combined with" or "coupled to" another element, it may be connected directly to or coupled directly to another element, or another element may be "connected", "combined", or "coupled" between them.

FIG. 1 is a schematic block diagram of the radar system according to an embodiment of the present disclosure.

Referring to FIG. 1, the radar system 100 according to the present embodiment may include a signal processor 110, a transmitter 120, an antenna unit 130 and a receiver 140.

The signal processor 110 may include a target determiner 111 for acquiring target information from target data and a code generator 112 for generating an identification code.

The code generator 112 may generate the identification code and transmit the identification code to the transmitter 120 and the receiver 140. Here, the identification code may be an identifier for distinguishing the transmission signal or the reflection signal radiated from each of the plurality of radar systems. The identification code may be composed of a data string having a length of a predetermined number of bits.

The code generator 112 may generate the identification code at the time of operation of the radar system 100 and transmit the generated identification code to the transmitter 120 and the receiver 140.

Alternatively, the code generator 112 may transmit the previously stored identification code to the transmitter 120 and the receiver 140.

If the code generator 112 generates an identification code, the code generator 112 may randomly generate the identification code by using a pseudo random function.

The target determiner 111 may analyze the target data transmitted from the receiver 140 to obtain target information. The target information may include information on the presence or absence of the target and the distance information and speed information of the target. The manner for acquiring target information from the target data in the radar system 100 is generally known and will not be described in detail here.

The signal processor 110 may control the transmitter 120 to generate the first signal.

At this time, the signal processor 110 may set the frequency and the waveform of the first signal. For example, the signal processor 110 may set the first signal to have a waveform of a chirp signal. The code generator 112 may set the length of the identification code in correspondence with the waveform of the first signal.

Alternatively, the signal processor 110 may be implemented as an integrated control unit or domain control unit (DCU) installed in a vehicle or as a module of an ECU.

The integrated control unit or ECU of the vehicle may include a processor, a storage device such as a memory and a computer program capable of performing a specific function. The target determiner 111, the code generator 112 may be implemented as a software module capable of performing a corresponding function.

The transmitter 120 may generate the first signal and adjusts the phase of the first signal in response to the identification code generated by the code generator 112 and output the phase-adjusted second signal to the antenna unit 130.

The transmitter 120 may include a signal generator 121, a port selector 122, and a phase adjuster 123.

The signal generator 121 may include an oscillator, a voltage control oscillator (VCO) and so on, and may generate the first signal having a waveform based on the control of the signal processor 110.

The port selector 122 may receive the identification code from the code generator 112 and select at least one input port of the plurality of input ports included in the phase adjuster 123 according to the received identification code.

In addition, the port selector 122 transmits the first signal received from the signal generator 121 to the selected input port.

Here, the port selector 122 may function as a switch for changing the propagation path of the first signal according to the value of the identification code.

The phase adjuster 123 may include a plurality of input ports and at least one output port. The phase adjuster may generate the second signal by adjusting a phase of the first signal in response to the input port through which the first signal is transmitted and may output the second signal to the antenna unit 130.

At this time, the phase adjuster 123 may pre-set a phase difference to be adjusted between each of the plurality of input ports and the at least one output port. That is, the phase of the second signal output to the output port may be determined based on the input port through which the first signal is transmitted among the plurality of input ports.

Accordingly, if the port selector 122 selects an input port to which the first signal is transmitted among the plurality of input ports of the phase adjuster 123 in response to the identification code, the phase of the second signal output through at least one output port of the phase adjuster 123 to the antenna unit 130 may be is determined. A detailed description of the phase adjuster 123 will be described later.

The antenna unit 130 may receive the second signal from the transmitter 120 and transmit the transmission signal, and may receive the receiving signal and transmit the receiving signal to the receiver 140. The antenna unit 130 may include at least one transmission antenna 131 and at least one receiving antenna 132. Each of the at least one transmission antenna 131 and the at least one receiving antenna 132 may be implemented as an array antenna in which a plurality of feeding elements are arranged.

Each of at least one transmission antenna 131 may vary the intensity and direction of the transmission signal based on at least one of the second signal transmitted through at least one output port of the phase adjuster 123. That is, the transmission antenna 131 may adjust the beam pattern of the transmission signal.

In FIG. 1, the transmission antenna 131 and the receiving antenna 132 are separated from each other for convenience of explanation. However, the transmission antenna 131 and the receiving antenna 132 may be implemented as an integrated form.

The receiver 140 may pre-process the receiving signal received through the antenna unit and may filter the receiving signal according to the identification code so as to extract the reflection signal reflected from the target. The receiver 140 may include a pre-processor 141 and a code filter 142.

The pre-processor 141 may receive the receiving signal from the antenna unit 130, mix the receiving signal with the second signal output from the phase adjuster 123, down-convert the frequency of the mixed signal, sample the down-converted signal, and acquire the receiving data.

The pre-processor 141 may include a low noise amplifier (LNA) for low noise amplifying the signal, a mixer for mixing the low noise amplified receiving signal, an amplifier for amplifying the mixed receiving signal And a sampler for digitally converting the amplified receiving signal to generate the receiving data, a digital filter and the like.

The code filter 142 may generates a code window corresponding to the identification code, compare the code window with the receiving data obtained in the pre-processor 141, and extract target data for the reflection signal. The code filter 142 may compare the receiving data sequentially transmitted with a code window having a fixed size, and may extract an area having the highest degree of similarity with the code window among the receiving data as target data. The code filter 142 may extract, as the target data, receiving data having a maximum value obtained by multiplying the receiving data by each bit of the code window.

Here, the target data may be data in receiving data having a pattern similar to that of a transmission signal radiated based on the identification code, and may be data about a reflection signal component in which a transmission signal is reflected on a target in the receiving signal.

As a result, the radar system according to the present embodiment may transmit the transmission signal according to the identification code, and can easily distinguish the reflection signal for the transmission signal from the receiving signal by using the identification code, thereby it is possible to eliminate the interference caused by the signal from the other radar system, improve the efficiency of frequency usage and improve the reliability and accuracy of the radar system.

Generally, the signal generator 121 requires a stabilization time in order to stably generate the first signal having the frequency and phase required by the radar system 100. Therefore, if the signal generator 121 of the transmitter 120 is configured to directly generate the first signal corresponding to the identification code, it may be difficult to quickly change the phase, the beam shape of the transmission signal due to this stabilization time.

However, the radar system 100 according to the present embodiment includes the port selector 122 and the phase adjuster 123 and changes the transmission path of the first signal based on the identification code, so that it is possible to quickly and easily adjust the phase of the transmission signal or adjust the size and direction of the beam formed by the transmission signal.

Although the phase adjuster 123 is shown in FIG. 1 as being included in the transmitter 120, this is for convenience of description, and the phase adjuster 123 may be provided separately from the transmitter 120. Similarly, although the code filter 142 is illustrated as being included in the receiver 140, the code filter 142 may be included in the signal processor 110.

At least one of the signal processor 110, the signal generator 121, the port selector 122 and the code filter 142 may be implemented in the form of an integrated circuit chip.

Figure 2:
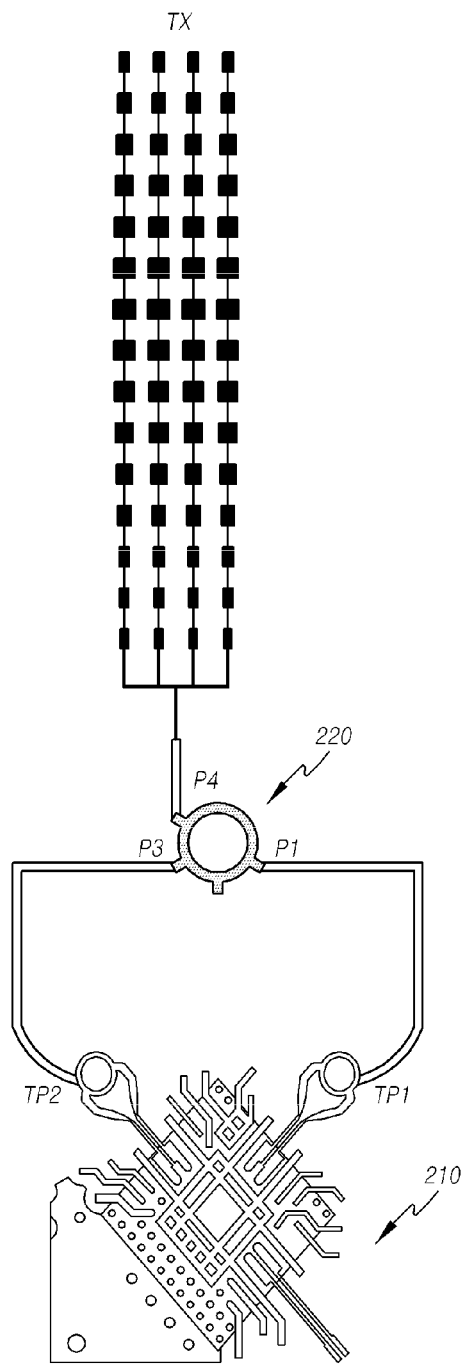
FIG. 2 is a configuration diagram of the transmission apparatus of the radar system according to an embodiment of the present disclosure.
Figure 3:
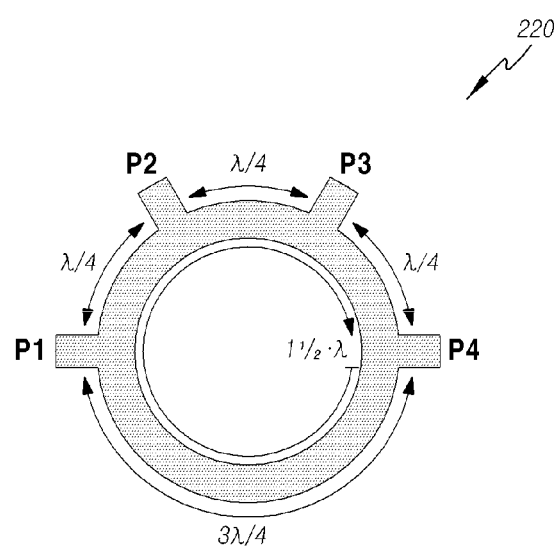
FIG. 3 is a detailed view of the phase adjuster of FIG. 2.

FIG. 2 is a configuration diagram of the transmission apparatus of the radar system according to an embodiment of the present disclosure, and FIG. 3 is a detailed view of the phase adjuster of FIG. 2.

FIG. 2 illustrates an example in which the phase adjuster 123 is implemented as a ring-type hybrid coupler (RHC) or rat race coupler (RRC) 220.

In an embodiment according to the FIG. 2, it is assumed that the integrated circuit chip 210 includes a signal processor 110, a signal generator 121 and a port selector 122. The integrated circuit chip 210 may include a plurality of transmission ports TP1 and TP2 each corresponding to an input port of the phase adjuster 123 in case that the integrated circuit chip 210 includes a port selector 122.

Referring to FIG. 3, the ring-type hybrid coupler 220 may include four ports P1 to P4 arranged radially sequentially from the center portion of the ring shape. Each of the four ports P1 to P4 may be disposed apart from each other by a distance of $\lambda/4$ ($\lambda$ is the wavelength of the first signal) along the central portion of the ring shape, and the first port P1 and the fourth port P4) may be arranged apart from each other by a distance of $3\lambda/4$.

The first signal and the second signal inputted or outputted through the ports arranged adjacent to each other among the four ports P1 to P4 have a phase difference of 90 degrees with respect to each other. The first signal and the second signal inputted or outputted through the first port P1 and the fourth port P4 may have a phase difference of 270 degrees.

In the embodiment of FIG. 2, the first port P1 and the third port P3 may be respectively connected to the first and second transmission ports TP1 as input ports for receiving the first signal, and the fourth port P4 may be connected to at least one transmission antenna TX as an output port P4 for outputting a second signal.

Therefore, if the first signal is inputted through the first port P1, the ring-type hybrid coupler 220 may output the second signal having the 270 degree phase difference with the first signal through the fourth port P4.

Alternatively, if the first signal is inputted through the third port P3, a second signal having a phase difference of 90 degrees with the first signal may be output through the fourth port P4.

That is, the ring-type hybrid coupler 220 may switch the phase of the second signal by 180 degrees according to whether the first signal is inputted through the first port P1 or the third port P3, and transmit the second signal through the transmission antenna TX. And the transmission antenna TX may transmit a transmission signal corresponding to the second signal.

In this manner, the port selector 122 may select the first transmission port TP1 connected to the first port P1 or the second transmission port TP2 connected to the third port P3 according to the identification code and may output the first signal through the selected port, thereby the phase of the transmission signal can be quickly and easily switched by 180 degrees.

Although not shown, the second port P2 may be connected to termination means such as termination resistance so as to prevent noise signals due to the reflection waves.

Figure 4:
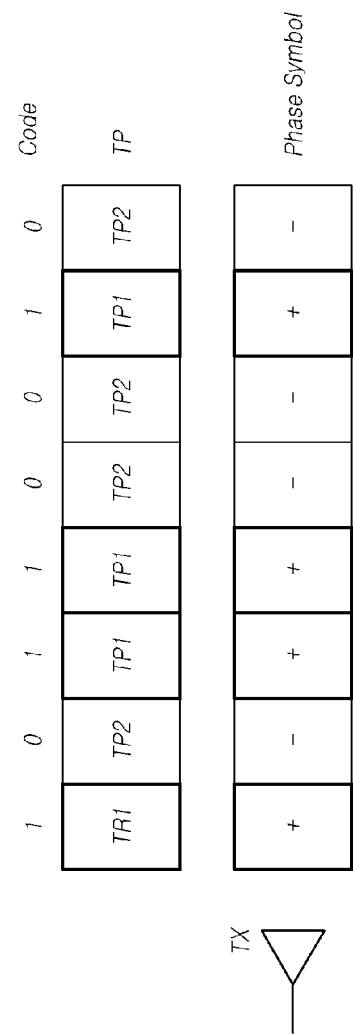
FIG. 4 is a diagram for explaining a port selected according to an identification code and a phase code of a transmission signal.

FIG. 4 is a diagram for explaining a port selected according to an identification code and a phase code of a transmission signal.

In FIG. 4, it is assumed that the identification code has data format of an 8-bit data length and assumed to have a value of & "10110010" as an example. Here, the data length of 8 bits may mean one modulation unit of the transmission signal.

If the bit value of the identification code is 1, the port selector 122 outputs the first signal to the first port P1 of the phase adjuster 123 through the first transmission port TP1, and if the bit value of the identification code is 0, the first signal is output to the third port P3 of the phase adjuster 123 through the second transmission port TP2. As such, the identification code may be used to control the second signal having two phases to be radiated.

The phase adjuster 123 may output the second signal phase-inverted by 180 degrees to the fourth port P4 as the output port depending on whether the first signal is received at the first port P1 or the third port P3. That is, if the phase of the transmission signal when the first signal is input to the first port P1 is positive (+) phase, when the first signal is input to the third port P3, the phase of the transmission signal is inverted by 180 degrees so that transmission signal in this case may have negative (−) phase.

That is, when the second signal is set to signals having two phases, the two phases may be configured to have a 180 degree difference. In addition, the identification code may be composed of at least one first value and at least one second value (ex, 0 or 1), and each of at least one first value and at least one second value may indicate each of two phases of the second signal respectively. The number of the at least one first value is set to be the same as the at least one second valuein one modulation unit (ex, 8 bits). For example, as shown in FIG. 4, the identification code may be set to four 0 values and four 1 values.

Figure 5:
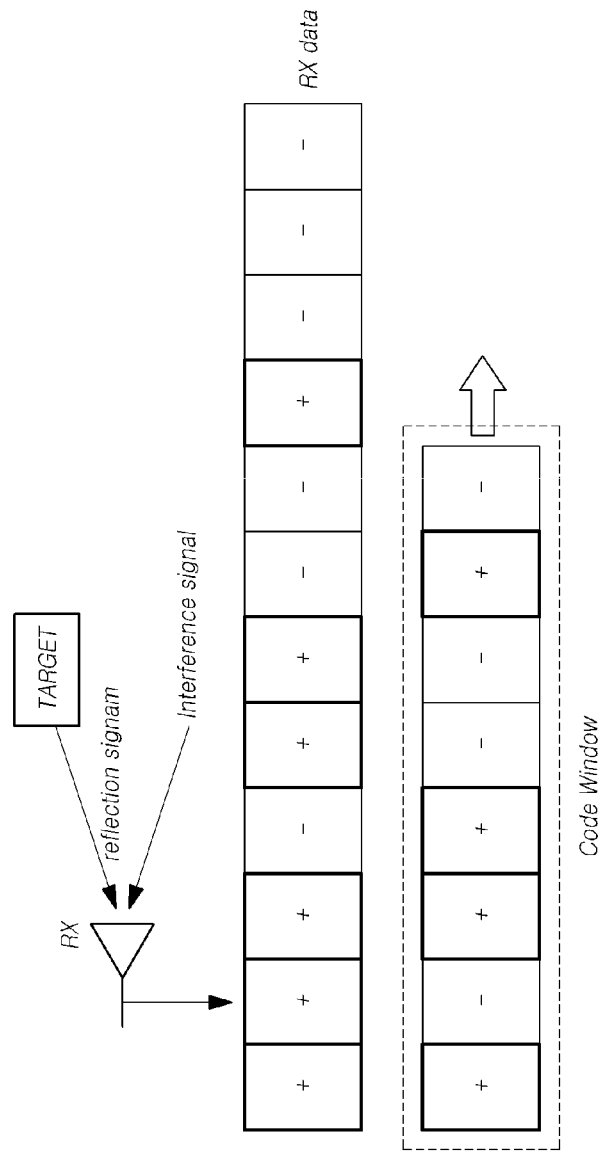
FIGS. 5 and 6 are views for explaining receiving data and a code window.
Figure 6:
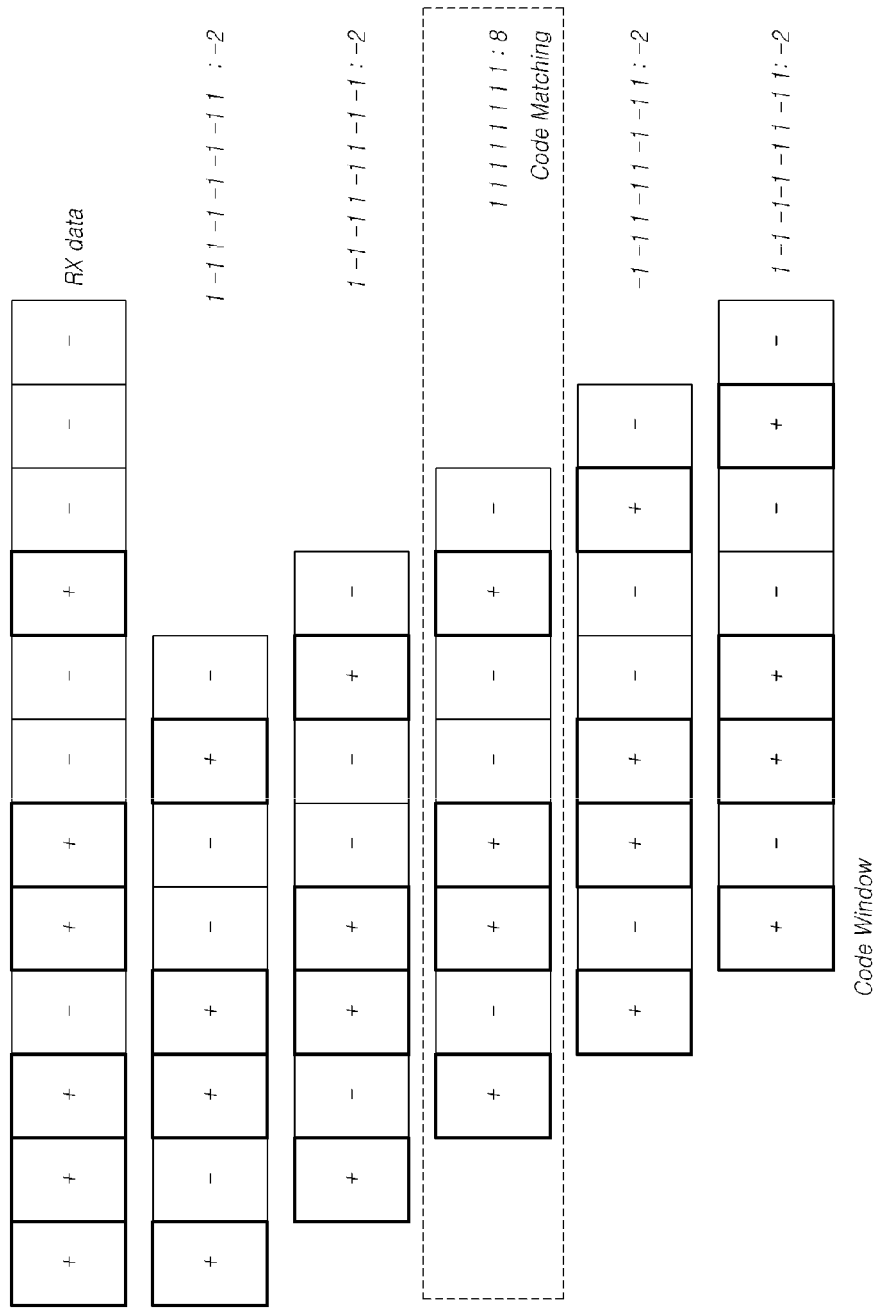
Figure 7:
FIG. 7 illustrates an example of a code matching point where the receiving data and the code window are matched.

FIGS. 5 and 6 are views for explaining receiving data and a code window, and FIG. 7 illustrates an example of a code matching point where the receiving data and the code window are matched.

As shown in FIG. 4, the transmission signal transmitted through the transmission antenna TX depending on the identification code may be reflected on the target, and the receiving signal may be received by the receiving antenna RX as the reflection signal. At this case, the receiving signal received by the receiving antenna RX may include an interference signal as well as a reflection signal reflected at the target. Here, the interference signal may include not only the ambient noise, but also a transmission signal or a reflection signal radiated from another radar system.

However, in the radar system 100 according to the present embodiment, since the transmission signal having the pattern corresponding to the identification code is transmitted, the reflection signal reflected at the target also has the same pattern as the transmission signal. Therefore, the receiver 140 can easily extract the reflection signal by identifying the signal with the same pattern as the transmission signal in the received signal. As described above, it may be effective for noise processing and reflection signal extraction if the number of inverted phases is set to be the same in one modulation unit.

As described above, the pre-processor 141 of the receiver 140 may mix the receiving signal with the second signal output from the phase adjuster 123, may down-convert the frequency of the mixed signal, may sample the down-converted signal so as to obtain the receiving data and transfer the receiving data to the code filter 142.

The code filter 142 may generate the code window corresponding to the identification code and compare the receiving data (RX data) with the code window. At this case, as shown in FIG. 6, the code filter 142 may move the code window with respect to the receiving data (RX data) sequentially transmitted and may determine the receiving data at the point where the comparison value between the receiving data and the code window becomes the maximum as the target data. As an example, the code filter 142 may use a value obtained by multiplying the receiving data (RX data) with each bit of the code window and by adding the multiplied value as a comparison value.

As shown in FIG. 7, the code filter 142 may acquire target data corresponding to the reflection signal from the received signal at a code matching point at which the comparison value between the receiving data and the code window becomes maximum.

In embodiments according to FIGS. 2 to 7, it is described with an assumption that the port selector 122 selects the first transmission port TP1 and second transmission port TP2 depending on the identification code and outputs the first signal, so that the phase of the transmission signal is switched by 180 degrees and the transmission signal is output.

However, the port selector 122 may output the first signal to either the first transmission port TP1 or the second transmission port TP2 according to the identification code, or may output the first signal by selecting both the first transmission port TP1 and the second transmission port TP2.

If the port selector 122 outputs the first signal to one of the first transmission port TP1 and the second transmission port TP2, a transmission signal of a specific phase is radiated through the antenna unit 130. On the other hand, if the port selector 122 selects both the first transmission port TP1 and the second transmission port TP2 and outputs the first signal through both the first transmission port TP1 and the second transmission port TP2, the first signals input through the first port P1 and the third port P3 may cancel each other at the central portion of the ring-type hybrid coupler so that the antenna unit 130 may not transmit the transmission signal.

This enables the transmission signal to be radiated in a pattern according to the identification code, similar to adjusting the phase of the transmission signal according to the identification code, so that the radar system 100 can easily acquire the target data.

Figure 8:
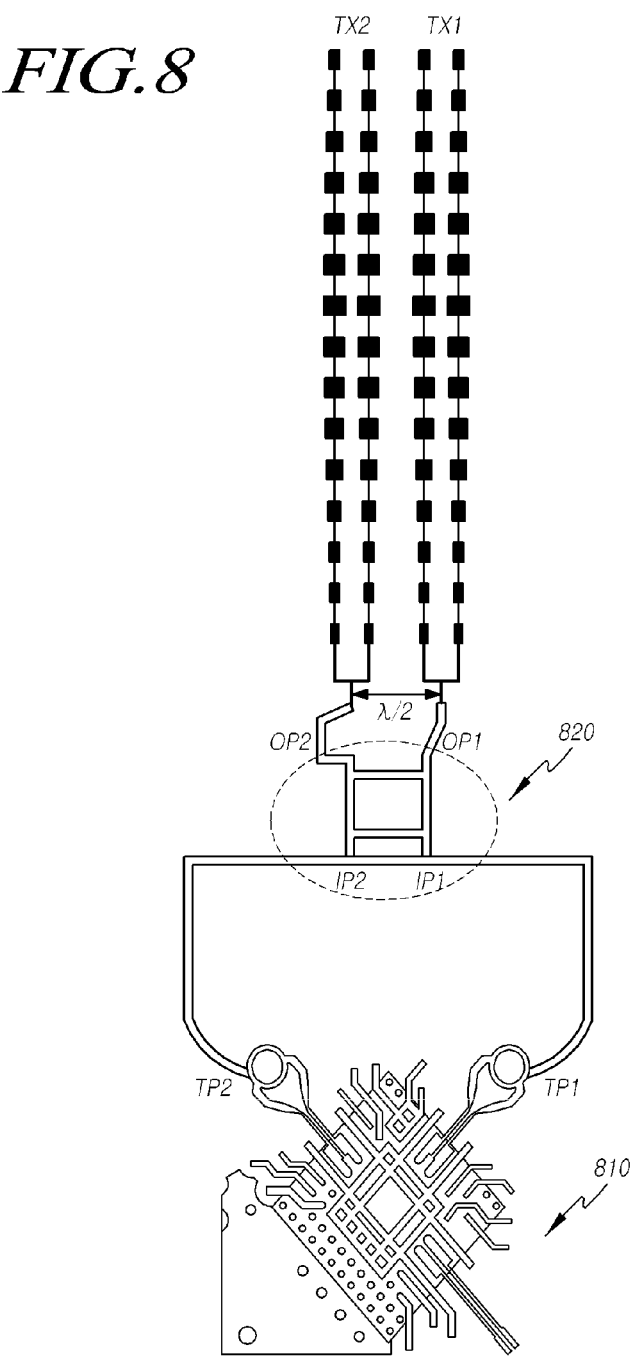
FIG. 8 is a configuration diagram of the transmission apparatus of the radar system according to another embodiment of the present disclosure.
Figure 9:
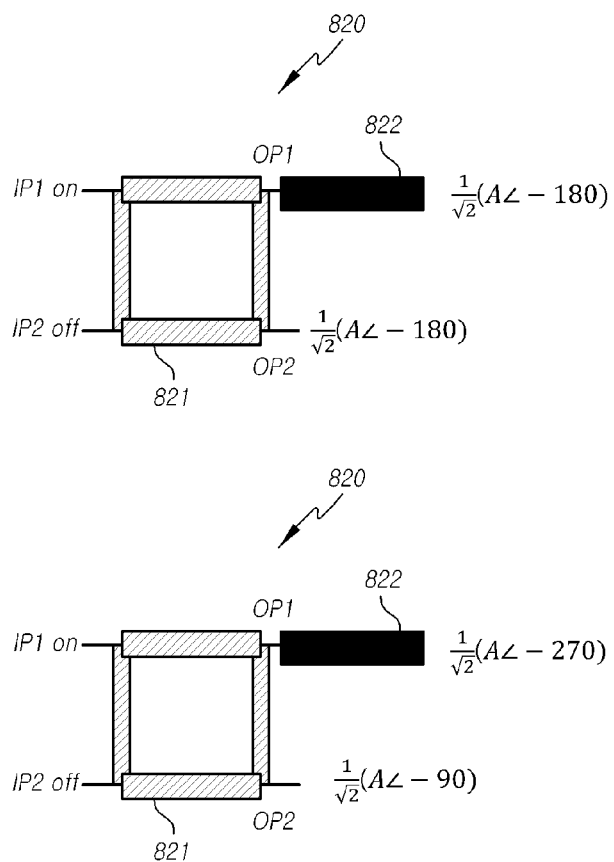
FIG. 9 is a detailed view of the phase adjuster of FIG. 8.

FIG. 8 is a configuration diagram of the transmission apparatus of the radar system according to another embodiment of the present disclosure, and FIG. 9 is a detailed view of the phase adjuster of FIG. 8.

In the embodiment according to FIG. 8, it is also assumed that the integrated circuit chip 210 includes the signal processor 110, the signal generator 121, and the port selector 122.

The integrated circuit chip 210 may include a plurality of transmission ports TP1 and TP2 respectively corresponding to the input ports of the phase adjuster 123. In addition, as an example, the phase adjuster 810 in FIG. 8 may include a branch line coupler 820 or a quadrature hybrid coupler and a delay line 822.

Referring to FIGS. 8 and 9, the branch line coupler 820 may include two input ports IP1 and IP2 and two output ports OP1 and OP2. The first input port IP1 of the two input ports IP1 and IP2 is connected to the first transmission port TP1 and the second input port IP2 is connected to the second transmission port TP2. The branch line coupler 820 may include two transmission lines 821 for connecting the first and second input ports IP1 and IP2 and the first and second output ports OP1 and OP2 respectively, and two branch lines connecting between the two transmission lines. Here, the length of each of the two transmission lines and the two branch lines may be $\lambda/4$ ($\lambda$ is the wavelength of the first signal).

Accordingly, if the first signal is input to the first input port IP1, the second signal having a phase difference of 90 degrees from the first signal is output to the first output port OP1, and the second signal having a phase difference of 180 degrees from the first signal is output to the second output port OP2. On the other hand, if the first signal is input to the second input port IP2, the second signal having a phase difference of 180 degrees from the first signal is output to the first output port OP1, and a second signal having a phase difference of 90 from the first signal is output to the second output port OP2.

That is, the two second signals output to the first and second output ports OP1 and OP2 have a phase difference of +90 degrees or a phase difference of −90 degrees depending on whether the input port of the first signal is the first input port IP1 or the second input port IP2.

The delay line 822 may be connected to one of the first output port OP1 and the second output port OP2 and may output one of the two second signals output from the branch line coupler 820 with a phase delay of 90 degrees. Although the delay line 822 is illustrated as being connected to the first output port OP1 in FIG. 9, the delay line 822 may be connected to the second output port OP2. In addition, the delay line 822 may have a length of λ/4 equal to the transmission line and the branch line of the branch line coupler 820.

Accordingly, since the two second signals output from the branch line coupler 820 have a phase difference of 90 degrees or −90 degrees, if the delay line 822 is connected to the first output port OP1, the second signal output to the first output port OP1 via the delay line 822 may be delayed by 90 degrees.

Therefore, if the first signal is input through the first input port IP1, the second signal output from the delay line 822 and the second signal output from the second output port OP2 may be the same signal having a phase difference of 180 degrees from the first signal. That is, the two second signals output to the antenna unit 130 may have the same phase.

On the other hand, if the first signal is input through the second input port IP2, the second signal output from the delay line 822 has a phase difference of 270 degrees with respect to the first signal, and the second signal output from the second output port OP2 has a phase difference of 90 degrees with respect to the first signal. That is, the two second signals output to the antenna unit 130 may have a phase difference of 180 degrees from each other.

Therefore, the port selector 122 may select one of the first transmission port TP1 connected to the first input port IP1 and the second transmission port TP2 connected to the second input port IP2 based on the identification code and may output the first signal through the selected transmission port, so that the second signal output to the antenna unit 130 may have the same phase or may have a phase difference of 180 degrees from each other.

If the second signal is set to have two phases, the two phases may be configured to have a 180 degree difference from each other. In this case, the identification code may be composed of at least one first value and at least one second value (ex, 0 or 1) for indicating two phases of the second signal respectively, and the number of the at least one first value is set to be the same as the at least one second value in one modulation unit (ex, 8 bits). For example, the identification code may be set to have four 0 values and four 1 values.

Meanwhile, in the embodiment of FIG. 8, the antenna unit 130 includes two transmission antennas TX1 and TX2 for receiving two second signals transmitted from the phase adjuster 123 respectively. The two transmission antennas TX1 and TX2 may be array antennas in which a plurality of feeding elements are arranged, and The two transmission antennas TX1 and TX2 may be arranged to be spaced apart from each other by a predetermined distance. For an example, the two transmission antennas TX1 and TX2 may be arranged apart from each other by λ/2.

Figure 10:
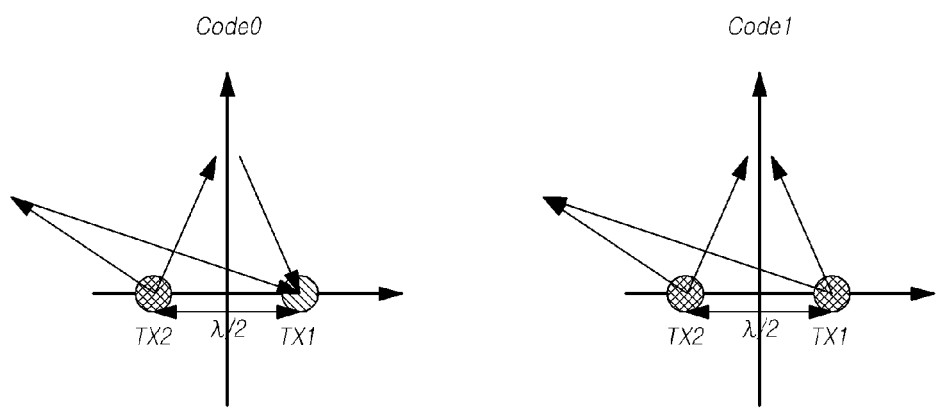
FIGS. 10 to 12 are views for explaining beam patterns of a transmission signal radiated from the antenna unit of FIG. 8.
Figure 11:
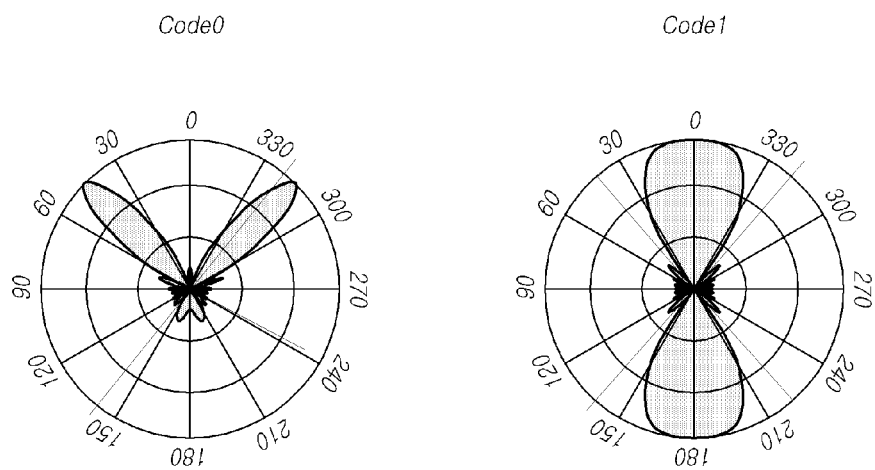
Figure 12:
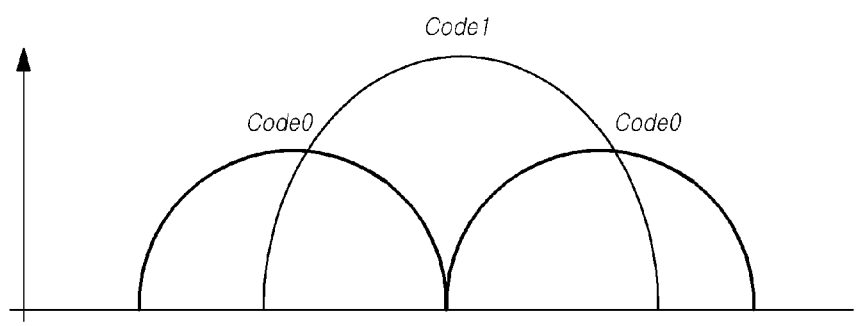

FIGS. 10 to 12 are views for explaining beam patterns of a transmission signal radiated from the antenna unit of FIG. 8.

In particular, FIG. 10 is a view for explaining a correlation between two transmission signals transmitted from two transmission antennas TX1 and TX2 according to the identification code, and FIG. 11 is a diagram for illustrating a beam pattern formed by two transmission signals transmitted from two transmission antennas TX1 and TX2 according to the identification code. FIG. 12 is a diagram for illustrating a comparison of beam patterns according to the identification code.

In the embodiment of FIG. 10 similar to that of FIG. 8, two transmission antennas TX1 and TX2 are arranged apart from each other by a distance of λ/2. In addition, the port selector 122 outputs the first signal to the first input port IP1 when the corresponding bit value of the identification code is 1 and outputs the first signal to the second input port IP2 when the bit value is 0.

Therefore, if the bit value of the identification code is 0 (Code 0), the port selector 122 outputs the first signal to the second input port IP2, and the phase adjuster 123 outputs two second signals having a phase difference of 180 degrees to the two transmission antennas TX1 and TX2 respectively. Since the two transmission antennas TX1 and TX2 spaced apart from each other by a distance of λ/2 receive the second signal having a phase difference of 180 degrees respectively, the transmission signals transmitted from the respective transmission antennas TX1 and TX2 may be cancel each other at the position with the same distance from the two transmission antennas TX1 and TX2. However, the transmission signals radiated from the respective transmission antennas TX1 and TX2 may be combined at a point where the distance from each of the two transmit antennas TX1 and TX2 differs by λ/2, and may have the maximum amplitude at that point.

Therefore, as shown on the left side of FIG. 11, the beam formed by the transmission signals transmitted from the transmission antennas TX1 and TX2 may have a pattern in which the beam has maximum amplitude in the +45 degrees and −45 degrees directions.

On the other hand, if the bit value of the identification code is 1 (Code 1), the port selector 122 outputs the first signal to the first input port IP1, and the phase adjuster 123 outputs two second signals having the same phase to the two transmission antennas TX1 and TX2 respectively. Since the two transmission antennas TX1 and TX2 receive the second signal having the same phase, the transmission signals transmitted from the respective transmission antennas TX1 and TX2 may be combined at a position apart from each of the two transmission antennas TX1 and TX2 by the same distance. On the other hand, the transmission signals transmitted from the respective transmission antennas TX1 and TX2 may be cancel each other at a point where the distance from each of the two transmit antennas TX1 and TX2 differs by λ/2.

Therefore, as shown in the right part of FIG. 11, the beam formed by the transmission signals transmitted from the transmission antennas TX1 and TX2 may have a pattern in which the beam magnitude is maximized in the 0 degree and 180 degree directions.

As shown in FIG. 12, the radar system 100 may adjust the direction of the transmission signal by varying the beam pattern of the transmission signal based on the identification code. The direction of the transmission signal may be changed in accordance with the identification code, so that the reflection signal reflected by the target at the specific position may also have the pattern corresponding to the identification code.

The receiver 140 may easily acquire target data from a receiving signal received through the receiving antenna 132 according to a pattern depending on the identification code.

Figure 13:
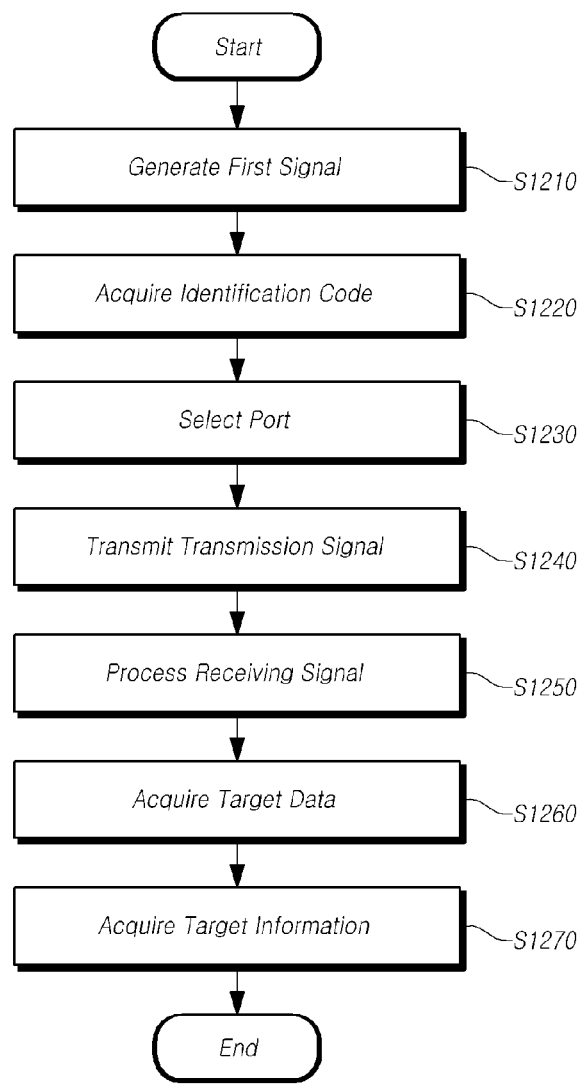
FIG. 13 is a flow chart of the target detection method of the radar system according to an embodiment of the present disclosure.

FIG. 13 is a flow chart of the target detection method of the radar system according to an embodiment of the present disclosure.

Referring to FIG. 13, the target detection method of the radar system according to the present embodiment will be described.

First, the signal generator 121 of the transmitter 120 generates the first signal (S1210).

The signal generator 121 may generate the first signal having a predetermined frequency and waveform according to the control of the signal processor 110.

Then, the code generator 112 of the signal processor 110 may acquire the identification code (S1220).

The code generator 112 may acquire a pre-stored identification code or directly generate an identification code. In the case that the code generator 112 directly generates the identification code, the identification code may be generated at random.

Alternatively, the identification code may be composed of at least one first value and at least one second value (ex, 0 or 1) for respectively indicating two phases of the second signal, and the number of the at least one first value is set to be the same as the number of the at least one second value in one modulation unit. For example, the identification code may be configured to have the same number of five 0 values and five 1 values.

The port selector 122 may receive the first signal from the signal generator 121 and may receive the identification code from the code generator 112.

The port selector 122 may select at least one input port among the plurality of input ports of the phase adjuster based on the received identification code and may output the first signal through the selected input port (S1230).

The phase adjuster 123 may adjust the phase of the first signal based on the input port to which the first signal is input, and may output the second signal to the antenna unit 130 through the output port. The antenna unit 130 may transmit the transmission signal in accordance with the received second signal (S1240).

At this case, the transmission signal transmitted from the antenna unit 130 may be varied in phase according to the identification code, and the pattern of the beam formed by the transmission signal may be varied. In particular, the direction of the beam formed by the transmission signal may be adjusted differently in accordance with the identification code.

The pre-processor 141 of the receiver 140 may convert the receiving signal transmitted through the antenna unit 130 to acquire receiving data (S1250). The pre-processor 141 may mix the receiving signal with the second signal output from the phase adjuster 123, may down-convert the frequency of the mixed signal, and may sample the receiving signal to acquire the receiving data.

The code filter 142 may generate the code window corresponding to the identification code, may compare the code window with the receiving data acquired in the pre-processor 141, and may acquire the target data for the reflection signal (S1260). Then, the target determiner 111 may analyze the target data transmitted from the receiver 140 to acquire target information (S1270).

Therefore, the transmission signal transmitted through the antenna unit 130 may be phase-adjusted according to the identification code or the beam pattern formed by the transmission signal may be varied based on the identification code. In addition, the reflection signal corresponding to the transmission signal from the receiving signal received by the antenna unit 130 may be easily distinguished or acquired by using the identification code.

According to the embodiments according to the present disclosure described above, it is possible to easily distinguish the interference signal and the reflection signal included in the receiving signal of the radar system, thereby to improve the reliability and accuracy of the radar system. In addition, a limited frequency band may be used for a plurality of radar systems, thereby it is possible increase the frequency utilization efficiency of the radar system.

Even though all components of embodiments of the present disclosure were described as being combined in a single part or being operated in cooperation with each other, the present disclosure is not limited thereto. That is, all the components may be selectively combined one or more parts and operated if it is within the object of the present disclosure. Further, all of the components may be implemented by single independent hardware, respectively, but some or all of the components may be selectively combined and implemented by computer programs having a program module that performs some or all of functions combined by one or more pieces of hardware. Codes or code segments constituting the computer programs may be easily inferred by those skilled in the art. The computer programs are stored in computer-readable media and read and executed by a computer, whereby embodiments of the present disclosure can be achieved. A magnetic storing medium, an optical recording medium, and a carrier wave medium may be included in the recording media of computer programs.

Further, terms 'include', 'constitute', 'have' etc. stated herein means that corresponding components may be included, unless specifically stated, so they should be construed as being able to further include other components rather than excepting other components. Unless defined otherwise, all the terms used in the specification including technical and scientific terms have the same meaning as those that are understood by those skilled in the art. The terms generally used such as those defined in dictionaries should be construed as being the dame as the meanings in the context of the related art and should not be construed as being ideal or excessively formal meanings, unless defined in the present disclosure.

The above description is an example that explains the spirit of the present disclosure and may be changed and modified in various ways without departing from the basic features of the present disclosure by those skilled in the art. Accordingly, the embodiment described herein are provided not to limit, but to explain the spirit of the present disclosure and the spirit and the scope of the present disclosure are not limited by the embodiments. The protective range of the present disclosure should be construed on the basis of claims and all the technical spirits in the equivalent range should be construed as being included in the scope of the right of the present disclosure.

What is claimed is:

1. A radar system comprising:
an antenna unit in which a plurality of feeding elements are arranged;
a transmitter configured to generate a first signal, adjust a phase of the first signal in response to an identification code to generate a second signal, and to output the second signal to the antenna unit;
a receiver configured to pre-process a receiving signal received through the antenna unit and to filter the receiving signal based on the identification code to extract a reflection signal reflected from a target; and
a signal processor configured to transmit the identification code to the transmitter and the receiver and to analyze the reflection signal to acquire information about the target,
wherein the transmitter includes;
a signal generator configured to generate the first signal by control of the signal processor,
a phase adjuster including a plurality of input ports and at least one output port connected to a transmission antenna, the phase adjuster being configured to generate the second signal by adjusting the phase of the first signal according to an input port through which the first signal is transmitted among the plurality of input ports, and to output the generated second signal to the antenna unit through at least one output port, and
a port selector configured to receive the first signal and transmit the first signal to at least one of the plurality of input ports of the phase adjuster in response to the identification code,
wherein the port selector is configured to:
select at least one of the plurality of input ports of the phase adjuster according to the identification code; and
transmit the first signal through the selected input port so that a transmission signal radiated through the antenna unit is phase inverted or has a pattern corresponding to the identification code, and
wherein the phase adjuster includes:
two transmission lines connecting a first input port and a second input port to a first output port and a second output port respectively and two branch lines connecting between the two transmission lines;
a branch line coupler configured to:
output two second signals having a first phase difference to the first output port and the second output port if the first signal is received at the first input port, and
output two second signals having a second phase difference to the first output port and the second output port if the first signal is received at the second input port, and
a delay line for delaying the phase of the second signal output from the first output port of the branch line coupler by a third phase difference.

2. The radar system of claim 1, wherein the receiver includes:
a pre-processor configured to mix the receiving signal and the second signal to frequency down-convert and sample the mixed signal so as to acquire receiving data; and
a code filter configured to generate a code window corresponding to the identification code, to compare the code window with the receiving data, to extract target data for the reflection signal, and to output the extracted target data to the signal processor.

3. The radar system of claim 2, wherein the signal processor includes:
a code generator configured to output the identification code; and
a target determiner configured to acquire speed information and distance information of the target from the target data received from the receiver.

4. The radar system of claim 3, wherein the identification code is generated in a pseudo-random manner or is pre-set and stored.

5. The transmission apparatus of claim 1, wherein the phase adjuster further includes a ring-type hybrid coupler in which a first port, a second port, a third port and a fourth port are sequentially arranged radially from a center portion of a ring shape so as to have a first phase difference between adjacent ports; and
wherein the first port or the third port of the ring-type hybrid coupler receives the first signal through the port selector as the input port and the fourth port output the second signal to the antenna unit as the output port.

6. The transmission apparatus of claim 5, wherein the first phase difference is 90 degrees.

7. The transmission apparatus of claim 1, wherein the antenna unit includes a first transmission antenna and a second transmission antenna receiving two second signals output from the phase adjuster respectively, and
wherein the first transmission antenna and second transmission antenna are spaced apart from each other by a first interval so that a beam of the transmission signal is formed in the predetermined magnitude and direction according to the phase difference between the two second signals output from the phase adjuster.

8. The transmission apparatus of claim 7, wherein each of the first phase difference and the third phase difference is 90 degrees and the second phase difference is −90 degrees, and the first interval is $\lambda/2$,
wherein $\lambda$ is a wavelength of the first signal.

9. The transmission apparatus of claim 1, wherein if the second signal is set by two phases, two phases are 180 degrees apart,
wherein the identification code includes at least one first value and at least one second value indicating two phases of the second signal respectively, and
wherein the number of the at least one first value is set to be the same as the at least one second value in one modulation unit.

* * * * *